(12) United States Patent
Mohri et al.

(10) Patent No.: US 12,235,630 B2
(45) Date of Patent: Feb. 25, 2025

(54) READING DEVICE AND METHOD TO READ IDENTIFICATION SIGNS ASSIGNED TO ORIGINAL WORKPIECES FOR A WELDING PROCESS

(71) Applicant: Panasonic Intellectual Property Management Co., Ltd., Osaka (JP)

(72) Inventors: Toshinari Mohri, Osaka (JP); Kazuki Hanada, Osaka (JP); Hisashi Kataoka, Osaka (JP); Ryutaro Monden, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 384 days.

(21) Appl. No.: 17/716,261

(22) Filed: Apr. 8, 2022

(65) Prior Publication Data

US 2022/0229420 A1 Jul. 21, 2022

Related U.S. Application Data

(63) Continuation of application No. PCT/JP2020/037362, filed on Sep. 30, 2020.

(30) Foreign Application Priority Data

Oct. 11, 2019 (JP) ................... 2019-188157

(51) Int. Cl.
*G05B 19/418* (2006.01)
*B23K 9/095* (2006.01)

(52) U.S. Cl.
CPC .......... *G05B 19/4187* (2013.01); *B23K 9/095* (2013.01); *G05B 19/4184* (2013.01)

(58) Field of Classification Search
CPC ............ G05B 19/4187; G05B 19/4184; G05B 2219/31303; G05B 2219/45104;
(Continued)

(56) References Cited

U.S. PATENT DOCUMENTS

2006/0180582 A1 8/2006 Andreasch et al.
2007/0173970 A1 7/2007 Shachar
(Continued)

FOREIGN PATENT DOCUMENTS

CN 110072660 7/2019
EP 1 510 282 3/2005
(Continued)

OTHER PUBLICATIONS

International Search Report issued Nov. 10, 2020 in International (PCT) Application No. PCT/JP2020/037362 with English translation.
(Continued)

*Primary Examiner* — Alicia M. Choi
(74) *Attorney, Agent, or Firm* — WENDEROTH, LIND & PONACK L.L.P.

(57) ABSTRACT

An identifier output method is executed by a welding system. The identifier output method includes: acquiring information on identifiers of a plurality of original workpieces to which identification signs are assigned, respectively, the identification signs being assigned such that information on the identifiers are readable; selecting, from the identifiers of the plurality of original workpieces according to a predetermined rule, an identifier to be set for a welded workpiece to be produced by a welding process using the plurality of original workpieces; and after the selecting, in a case in which any identification sign among the identification signs assigned to the plurality of original workpieces is read by the reading device, outputting, as an identifier of the welded workpiece, the information on the identifier that has been selected to the reading device.

5 Claims, 8 Drawing Sheets

(58) Field of Classification Search
CPC ...... G05B 2219/45134; G05B 19/4183; G05B 19/418; B23K 9/095; B23K 31/02; B23K 37/00; B23K 9/0953; B23K 26/032; Y02P 90/02
See application file for complete search history.

(56) References Cited

U.S. PATENT DOCUMENTS

| | | |
|---|---|---|
| 2014/0042137 A1 | 2/2014 | Daniel et al. |
| 2015/0122781 A1 | 5/2015 | Albrecht |
| 2016/0243640 A1 | 8/2016 | Albrecht |
| 2016/0267806 A1 | 9/2016 | Hsu et al. |
| 2017/0036288 A1 | 2/2017 | Albrecht et al. |
| 2017/0153616 A1* | 6/2017 | Sakakibara ........... G05B 19/048 |
| 2017/0189984 A1* | 7/2017 | Daniel .................. G05B 19/18 |
| 2019/0196442 A1 | 6/2019 | Ezawa |
| 2020/0139471 A1* | 5/2020 | Pliska .................. B23K 9/0953 |
| 2021/0046570 A1* | 2/2021 | Rappl .................. B23K 9/0953 |
| 2021/0060686 A1* | 3/2021 | Rappl .................. B23K 37/006 |
| 2022/0229420 A1* | 7/2022 | Mohri ................. G05B 19/4187 |

FOREIGN PATENT DOCUMENTS

| | | |
|---|---|---|
| FR | 3 076 754 | 7/2019 |
| JP | 2008-059116 | 3/2008 |
| JP | 2008-77559 | 4/2008 |
| JP | 2017-021563 | 1/2017 |
| JP | 2017-102548 | 6/2017 |
| JP | 2019-117627 | 7/2019 |

OTHER PUBLICATIONS

Written Opinion of the International Searching Authority issued Nov. 10, 2020 in International (PCT) Application No. PCT/JP2020/037362.

Extended European Search Report issued Oct. 18, 2022, in corresponding European Patent application No. 20874381.5.

Wang Yankai, "Design and Development of Conveying System for Body In White Flexible Welding Workshop", China Academic Journal Electronic Publishing House, "Chinese Excellent Master's Thesis Full Text Database (Engineering Science and Technology II)", Issue 4, pp. 1-4, Published: Apr. 2019.

* cited by examiner

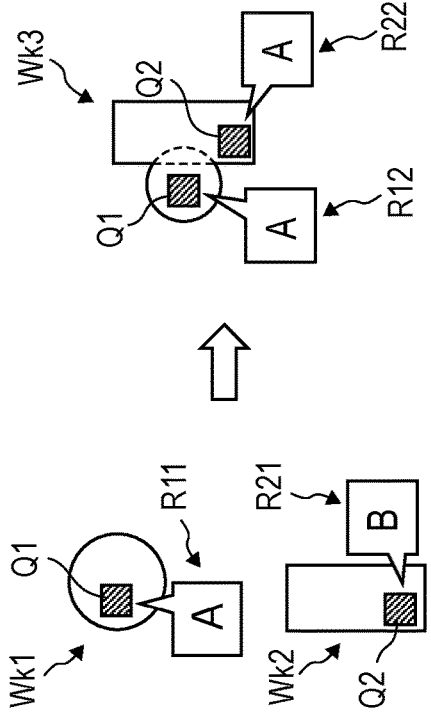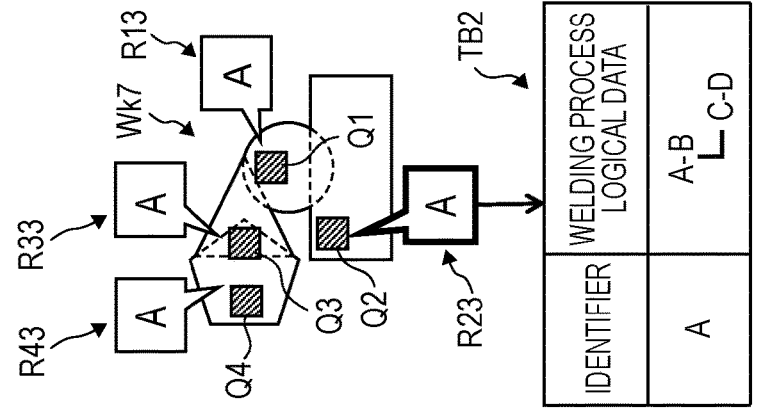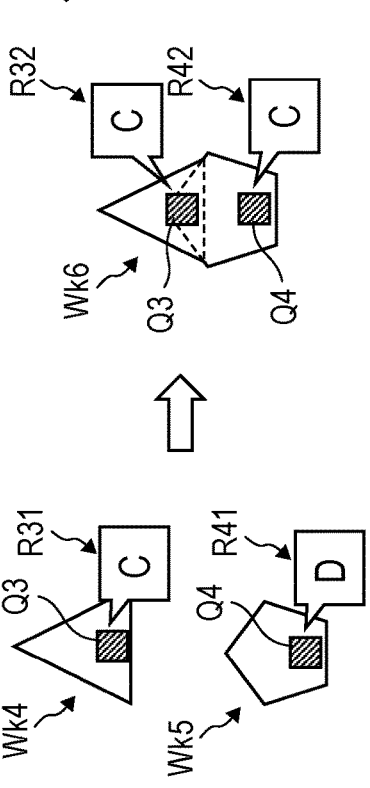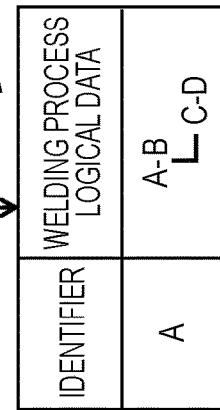
FIG. 5

READING DEVICE AND METHOD TO READ IDENTIFICATION SIGNS ASSIGNED TO ORIGINAL WORKPIECES FOR A WELDING PROCESS

CROSS-REFERENCE TO RELATED APPLICATIONS

This application is a continuation of PCT International Patent Application No. PCT/JP2020/037362 filed on Sep. 30, 2020, which claims the benefit of priority of Japanese Patent Application No. 2019-188157 filed on Oct. 11, 2019, the entire contents of which are incorporated herein by reference.

FIELD

The present disclosure relates to an identifier management method and a reading device.

BACKGROUND

JP-A-2017-102548 discloses a production management device that manages production performance information on a manufacturing line in which a plurality of manufacturing machines are arranged. The production management device detects which manufacturing machine a workpiece supplied to the manufacturing line is located in, generates an identifier unique to the workpiece when it is detected that the workpiece is located in any manufacturing machine, notifies the manufacturing machine in which the workpiece is located, and receives and records the generated identifier and the production performance information at the time of processing the workpiece corresponding to the identifier from the manufacturing machine. Each time the workpiece is sequentially moved to each of a plurality of manufacturing machines, the production management device records a plurality of identifiers generated for the workpiece and identifiers of products completed by the workpiece in association with each other.

SUMMARY

The present disclosure provides an identifier management method and reading device which support more efficient management of an identifier of a workpiece manufactured in a process such as welding, an identification sign assignment device, and a weldment.

The present disclosure provides an identifier output method to be executed by a welding system, the identifier output method including: acquiring information on identifiers of a plurality of original workpieces to which identification signs are assigned, respectively, the identification signs being assigned such that information on the identifiers are readable; selecting, from the identifiers of the plurality of original workpieces according to a predetermined rule, an identifier to be set for a welded workpiece to be produced by a welding process using the plurality of original workpieces; and after the selecting, in a case in which any identification sign among the identification signs assigned to the plurality of original workpieces is read by the reading device, outputting, as an identifier of the welded workpiece, the information on the identifier that has been selected to the reading device.

The present disclosure provides a reading device configured to read identification signs assigned to a plurality of original workpieces to be used in a welding process performed by a welding system, the reading device including: a reading unit configured to read the identification signs capable of outputting information on respective identifiers of the plurality of original workpieces; a processor configured to acquire, based on an identification sign that has been read, information on an identifier associated with the identification sign from the welding system; and an output unit configured to output the information on the identifier that has been acquired.

According to the present disclosure, it is possible to support more efficient management of an identifier of a workpiece produced in a process such as welding.

BRIEF DESCRIPTION OF DRAWINGS

FIG. 5 is an explanatory diagram showing an example of the operation outline at the time of welding using the workpiece with the ID "A", the workpiece with the ID "B", a workpiece with an ID "C", and a workpiece with an ID "D".

DETAILED DESCRIPTION (Introduction to Present Disclosure)

According to JP-A-2017-102548, a production management device can manage traceability data for each workpiece. However, in the configuration of JP-A-2017-102548, different identifiers are newly assigned each time the same workpiece is located in a plurality of different production machines. In other words, each time one workpiece is sequentially located on another production machine in a production line, the one workpiece has a plurality of different identifiers. Therefore, for example, when a plurality of workpieces are joined and another workpiece is produced as in a welding process, if a new identifier is assigned to the produced workpiece in accordance with JP-A-2017-102548, a relationship between an identifier of the workpiece used in the welding process and an identifier of the produced workpiece may be complicated, and thus it may be difficult to use traceability related to the produced workpiece. That is, management of the identifier of the workpiece is complicated, and work efficiency of a system administrator is deteriorated.

Therefore, in the following embodiments, examples of an identifier management method and a reading device which support more efficient management of the identifier of the workpiece produced in a process such as welding will be described.

Hereinafter, embodiments specifically disclosing an identifier management method and a reading device according to the present disclosure will be described in detail with reference to the drawings as appropriate. However, an unnecessarily detailed description may be omitted. For example, a detailed description of a well-known matter or a repeated description of substantially the same configuration may be omitted. This is to avoid unnecessary redundancy in the following description and to facilitate understanding of those skilled in the art. It should be noted that the accompanying drawings and the following description are provided to enable those skilled in the art to fully understand the present disclosure, and are not intended to limit the range of the claims.

First Embodiment

The welding system according to the first embodiment acquires information on identifiers of a plurality of original workpieces, and selects an identifier to be adopted as an identifier of a produced welded workpiece according to a predetermined rule based on completion of execution of a welding process using the plurality of original workpieces. The welding system sets the selected identifier as the identifier of the welded workpiece produced in the welding process. Hereinafter, the workpiece used in the welding process is defined as an "original workpiece", and the workpiece produced in the welding process is defined as a "welded workpiece". The "welded workpiece" may be referred to as a "secondary workpiece" or an "n-th workpiece" (n: an integer of 2 or more).

(Configuration of Welding System)

Figure 1:
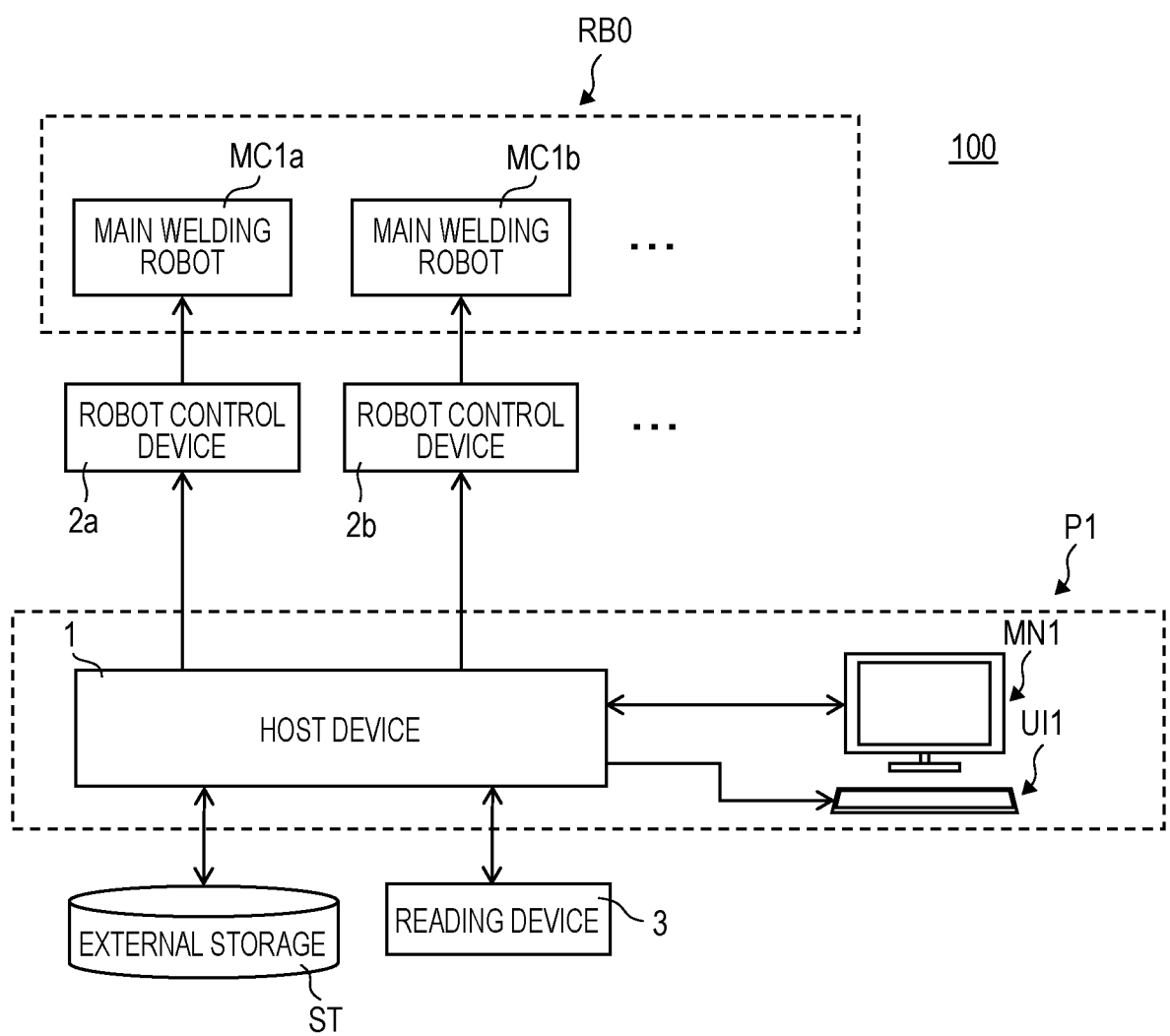
FIG. 1 is a schematic diagram showing a system configuration example of a welding system.

FIG. 1 is a schematic diagram showing a system configuration example of a welding system 100. The welding system 100 includes a host device 1 connected to each of an external storage ST, an input interface UI1, and a monitor MN1, a plurality of robot control devices (for example, robot control devices 2a and 2b), a plurality of main welding robots (for example, main welding robots MC1a and MC1b), and a reading device 3. The robot control device 2a is provided corresponding to the main welding robot MC1a, the robot control device 2b is provided corresponding to the main welding robot MC1b, and the same number of robot control devices are similarly provided corresponding to one main welding robot.

The host device 1 integrally controls the execution of the main welding (so-called welding process) executed by the corresponding main welding robots MC1a, MC1b, and so on via each of the plurality of robot control devices 2a, 2b, and so on. For example, the host device 1 reads, from the external storage ST, welding-related information input or set in advance by the user business operator (for example, a welding operator or a system administrator. The same applies hereinafter.), generates a welding process execution command including a part of contents of the welding-related information based on the welding-related information, and transmits the generated execution command to the corresponding robot control device (for example, the robot control device 2a). The execution command of the main welding described above is not limited to being generated by the host device 1, and may be generated by, for example, an operation panel (for example, a programmable logic controller (PLC)) of equipment in a factory or the like in which the main welding is performed, or an operation panel (for example, a teach Pendant (TP)) of the robot control devices 2a, 2b, and so on. The teach pendant (TP) is a device for operating the main welding robots MC1a, MC1b, and so on connected to the robot control devices 2a, 2b, and so on.

Here, the welding-related information is information indicating the content of the welding process executed for each main welding robot, and is created in advance for each welding process and registered in the external storage ST. The welding-related information includes, for example, the number of original workpieces required for the welding process, an identifier (hereinafter, abbreviated as "ID") of the original workpiece used in the welding process, workpiece information including a name and welding of the original workpiece, an execution scheduled date on which the welding process is scheduled to be executed, the number of welded workpieces, and various welding conditions at the time of the welding process. The welding-related information is not limited to data of items described above. The robot control device (for example, the robot control device 2a) causes the main welding robot (for example, the main welding robot MC1a) to perform the welding process using the plurality of original workpieces designated by the execution command based on the execution command transmitted from the host device 1. In the present specification, the type of the welding process is not limited, but in order to make the description easy to understand, a process of joining each of the plurality of original workpieces will be described as an example (see FIGS. 3 and 5).

The host device 1 is connected to the monitor MN1, the input interface UI1, the reading device 3, and the external storage ST so as to be able to input and output data, and is further connected to each of the plurality of robot control devices 2a, 2b, and so on so as to be able to communicate data. The host device 1 may include a terminal device P1 integrally including the monitor MN1 and the input interface UI1, and may further integrally include the external storage ST. In this case, the terminal device P1 is a personal computer (PC) used by a user business operator prior to execution of a welding process (for example, main welding). The terminal device P1 is not limited to the PC described above, and may be a computer device having a communication function, such as a smartphone or a tablet terminal.

The host device 1 acquires the above-described welding-related information from the external storage ST, generates the welding process execution command using the plurality of original workpieces based on the welding-related information, and transmits the execution command to the corresponding robot control devices 2a, 2b, and so on. When the host device 1 is notified of the completion of the welding process of each of the plurality of the original workpieces from the corresponding robot control devices 2a, 2b, and so on after the completion of the welding process by each of the main welding robots MC1a, MC1b, and so on, the host device 1 sets the ID of a welded workpiece (for example, a secondary workpiece) produced by the welding process to an ID selected in advance according to a predetermined rule. Further, the host device 1 generates the welding process logical data (see FIGS. 3 and 5) corresponding to the set welded workpiece.

The host device 1 stores, in the external storage ST, the information on the identification sign that can be assigned to each original workpiece and that can read the information on the ID set in the original workpiece and the ID set in the original workpiece in association with each other. Further, when the ID is set for the welded workpiece, the host device 1 stores the ID of the welded workpiece and the welding process logical data in the external storage ST in association with the information on the identification signs of the plurality of original workpieces. At this time, the host device 1 does not overwrite and store the set IDs of the welded workpieces to the IDs of the plurality of original workpieces used for producing the welded workpieces, and stores the IDs as the IDs to be output to the reading device 3. The information (data) stored in association with the identification sign is not limited to the information on the ID set for the plurality of original workpieces or welded workpieces and the welding process logical data, and may include, for example, welding-related information stored in association with the ID, and a management ID (see FIG. 6). Accordingly, the host device 1 can appropriately manage the IDs of the welded workpieces produced by the welding process by various main welding robots, and can similarly manage the IDs of the plurality of original workpieces used for producing the welded workpieces. Details of an operation of the host device 1 will be described later with reference to the drawings. The host device 1 may display the welding process logical data including the ID of the welded workpiece on the monitor MN1.

The host device 1 receives information on the identification sign read by the reading device 3 from the reading device 3 capable of reading the identification sign arranged for each of the workpiece. Based on the received information on the identification sign, the host device 1 acquires information on the ID set for the plurality of original workpieces or the welded workpiece read by the reading device 3 from the external storage ST, and transmits the information to the reading device 3. Here, the information acquired by the host device 1 is not limited to the information on the IDs set for the plurality of original workpieces or welded workpieces, and may include, for example, welding-related information, welding process logical data, and management IDs (see FIG. 6) stored in association with the IDs.

Here, the identification sign is an identification sign on which the ID set for the original workpiece or the welded workpiece is readable, and is, for example, a two-dimensional barcode, a QR code (registered trademark), a barcode, an IC tag, or an RF tag. The identification sign may be directly assigned (that is, marked) to the original workpiece by a laser, or may be assigned by attaching the IC tag or the RF tag.

The monitor MN1 may be configured with a display device such as a liquid crystal display (LED) or an organic electroluminescence (EL). The monitor MN1 may display, for example, a screen indicating the welding process logical data including the ID of the welded workpiece, which is output from the host device 1. Instead of the monitor MN1 or together with the monitor MN1, a speaker (not shown) may be connected to the host device 1, and the host device 1 may output the ID included in the welding process logical data by voice via the speaker.

The input interface UI1 is a user interface that detects an input operation of the user business operator and outputs the input operation to the host device 1, and may be configured using, for example, a mouse, a keyboard, or a touch panel. The input interface UI1 receives, for example, an input operation when the user business operator creates the welding-related information, or an input operation when a welding process execution command is transmitted to the robot control device 2a.

The reading device 3 is a device that reads the identification sign arranged on each workpiece and outputs information on the ID set for the original workpiece or the welded workpiece, and may include, for example, a camera, a charge coupled device (CCD) sensor, or a laser. The reading device 3 may be a terminal device capable of reading the identification sign by the operation of the user business operator, or may be a device that is provided in a robot that executes the welding process or a robot that executes an inspection of the welding portion and is capable of reading the identification sign based on a control command of the host device 1 before and after the welding process or the inspection process. The reading device 3 transmits the information on the read identification sign to the host device 1. The reading device 3 displays (outputs) the ID of the original workpiece or the welded workpiece received from the host device 1. The reading device 3 may output the ID of the original workpiece or the welded workpiece by voice.

The external storage ST is configured using, for example, a hard disk drive (HDD) or a solid state drive (SSD). The external storage ST stores, for example, information on the identification sign arranged on each workpiece, data of welding-related information created for each welding process, and welding process logical data (see FIGS. 3 and 5) including the ID of the welded workpiece produced by the welding process.

The robot control devices 2a, 2b, and so on are connected so as to be able to communicate data with the host device 1, and are connected so as to be able to communicate data with each of the main welding robots MC1a, MC1b, and so on. When the robot control devices 2a, 2b, and so on receive the welding process execution command sent from the host device 1, the robot control devices 2a, 2b, and so on control the corresponding main welding robots MC1a, MC1b, and so on based on the execution command to execute the welding process. When detecting the completion of the welding process, the robot control devices 2a, 2b, and so on generate a welding completion notification indicating the completion of the welding process and transmit the welding completion notification to the host device 1. Accordingly, the host device 1 can appropriately detect the completion of the welding process based on each of the robot control devices 2a, 2b, and so on. The method of detecting the completion of the welding process by the robot control devices 2a, 2b, and so on may be a method of determining the completion of the welding process based on a signal indicating the completion of the welding process from a sensor (not shown) included in, for example, a wire feeding device 300, or may be a known method, and a content of the method of detecting the completion of the welding process is not limited.

The main welding robots MC1a, MC1b, and so on as an example of the welding robot are connected to the robot control devices 2a, 2b, and so on so as to be able to communicate data with the robot control devices 2a, 2b, and so on. The main welding robots MC1a, MC1b, and so on execute the welding process instructed by the host device 1 under the control of the corresponding robot control devices 2a, 2b, and so on.

Figure 2:
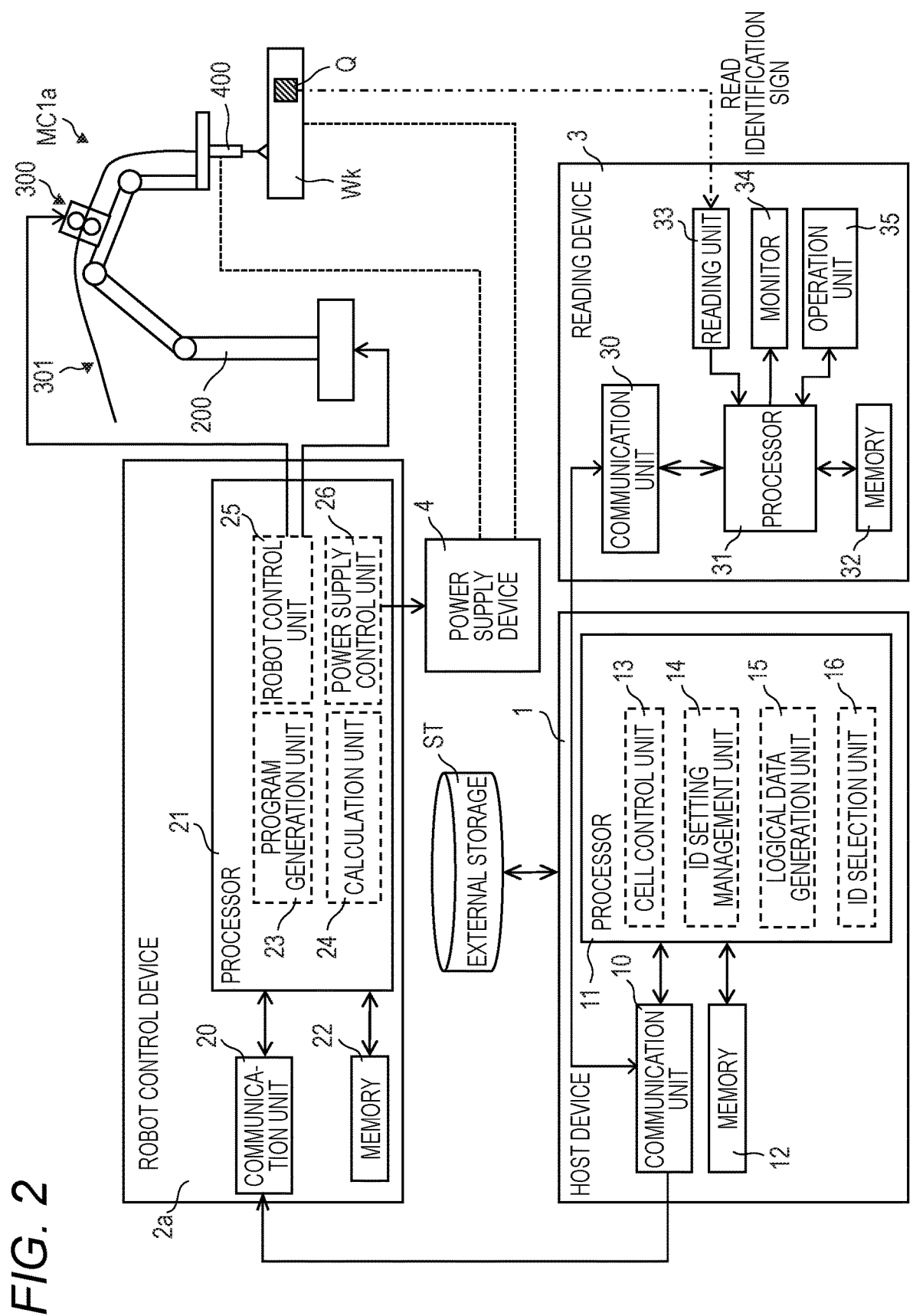
FIG. 2 is a diagram showing an internal configuration example of the host device, a robot control device, and a reading device according to a first embodiment.

FIG. 2 is a diagram showing an internal configuration example of the host device 1, the robot control device 2a, and the reading device 3 according to the first embodiment. In order to make the description easy to understand, the monitor MN1 and the input interface UI1 are not shown in FIG. 2, the main welding robot MC1a among the main welding robots MC1a, MC1b, and so on is exemplified, and further, the robot control device 2a among the robot control devices 2a, 2b, and so on is exemplified.

The main welding robot MC1a executes the welding process instructed from the host device 1 under the control of the robot control device 2a. The main welding robot MC1a performs, for example, arc welding in the welding process. However, the main welding robot MC1a may perform welding (for example, laser welding) other than the arc welding. In this case, although not shown, a laser head may be connected to a laser oscillator via an optical fiber instead of a welding torch 400. The main welding robot MC1a includes at least a manipulator 200, the wire feeding device 300, a welding wire 301, and the welding torch 400.

The manipulator 200 includes an articulated arm, and moves each arm based on a control signal from a robot control unit 25 (see the following description) of the robot control device 2a. Accordingly, the manipulator 200 can change a positional relationship between a workpiece Wk and the welding torch 400 (for example, an angle of the welding torch 400 with respect to the workpiece Wk) by the movement of the arm.

The wire feeding device 300 controls a feeding speed of the welding wire 301 based on a control signal (see the following description) from the robot control device 2a. The wire feeding device 300 may include a sensor capable of detecting a remaining amount of the welding wire 301.

The welding wire 301 is held by the welding torch 400. When electric power is supplied from a power supply device 4 to the welding torch 400, an arc is generated between a tip end of the welding wire 301 and the workpiece Wk, and the arc welding is performed. The illustration and description of a configuration and the like for supplying shielding gas to the welding torch 400 are omitted for the convenience of description.

The host device 1 generates the welding process execution command using each of the plurality of original workpieces by using the welding-related information input or set in advance by the user business operator, and transmits the execution command to the robot control device 2a. The host device 1 includes at least a communication unit 10, a processor 11, and a memory 12.

The communication unit 10 is connected to the robot control device 2 and the external storage ST so that data can be communicated among the communication unit 10, the robot control device 2a, and the external storage ST. The communication unit 10 transmits a welding process execution command (see the above description) generated by the processor 11 to the robot control device 2a. The communication unit 10 receives the ID of the welded work transmitted from the robot control device 2a and outputs the ID to the processor 11. The welding process execution command may include, for example, a control signal for controlling each of the manipulator 200, the wire feeding device 300, and the power supply device 4 included in the main welding robot MC1a.

The processor 11 is configured using, for example, a central processing unit (CPU) or a field programmable gate array (FPGA), and performs various processing and control in cooperation with the memory 12. Specifically, the processor 11 functionally implements a cell control unit 13, an ID setting management unit 14, a logical data generation unit 15, and an ID selection unit 16 by referring to a program held in the memory 12 and executing the program.

The memory 12 includes, for example, a random access memory (RAM) as a workpiece memory used when processing of the processor 11 is executed, and a read only memory (ROM) for storing a program defining processing of the processor 11. The RAM temporarily stores data generated or acquired by the processor 11. A program that defines processing of the processor 11 is written into the ROM. The memory 12 stores the data of the welding-related information read from the external storage ST, data of secondary workpiece information (see the following description) including the ID of the selected welded workpiece (secondary workpiece), and the welding process logical data (see FIGS. 3 and 5) of the secondary workpiece generated by the processor 11.

The cell control unit 13 generates the execution command for executing the welding process using the plurality of original workpieces defined (in other words, set) in the welding-related information based on the welding-related information stored in the external storage ST. The cell control unit 13 may generate a different welding process execution command for each welding process executed by each of the main welding robots MC1a, MC1b, and so on. The welding process execution command generated by the cell control unit 13 is transmitted to the corresponding robot control devices 2a, 2b, and so on via the communication unit 10.

The ID setting management unit 14 sets the ID of the welded workpiece (secondary workpiece) output from the ID selection unit 16 as the ID of the welded workpiece (secondary workpiece) produced by the welding process using each of the plurality of original workpieces, and stores the ID in the memory 12. The ID setting management unit 14 may store the ID of the welded workpiece (secondary workpiece) and the welding process logical data (see the following description) in the external storage ST in association with the information on the identification sign Q.

Figure 3:
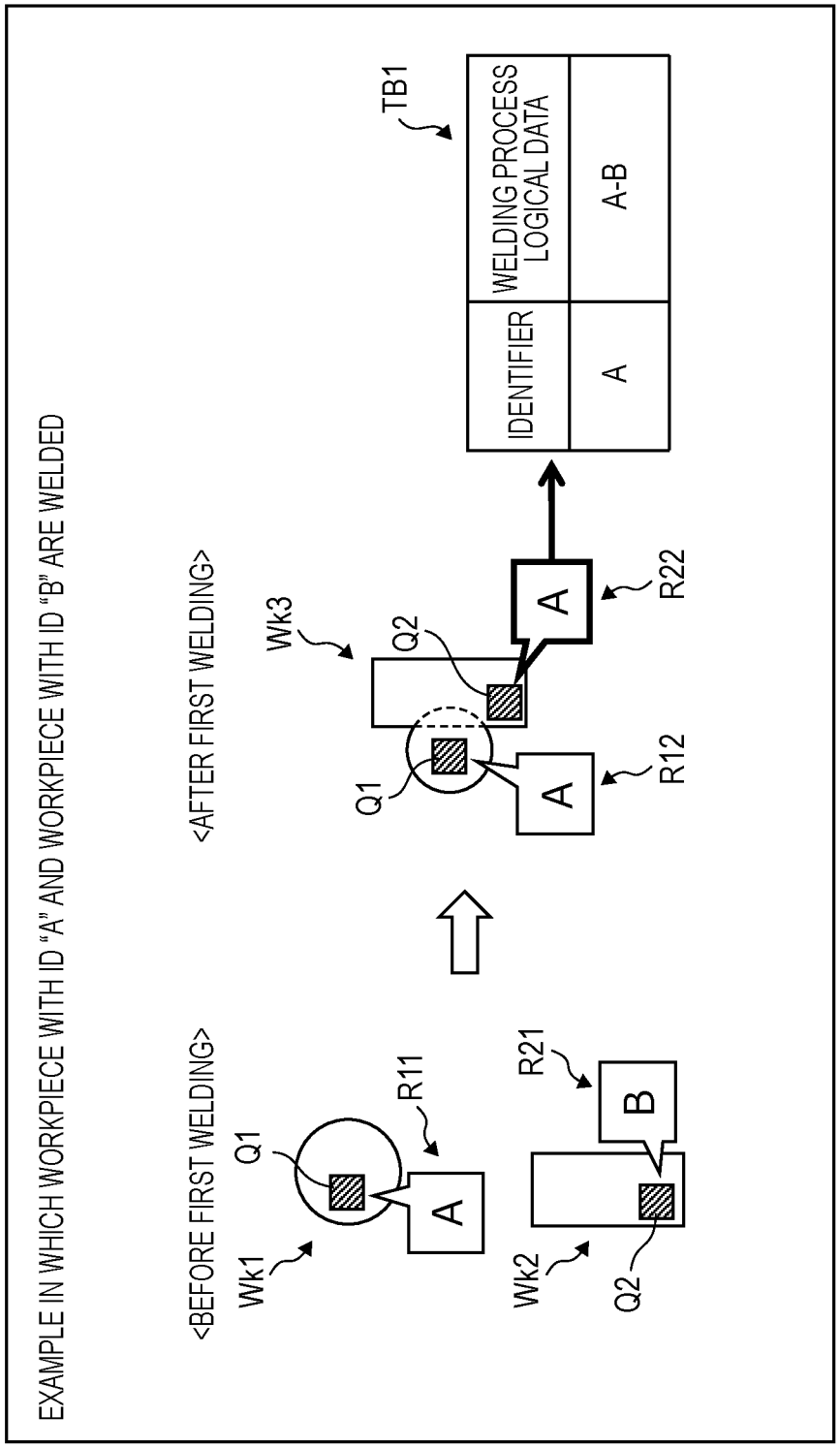
FIG. 3 is an explanatory diagram showing an example of an operation outline example at the time of welding using a workpiece with an ID "A" and a workpiece with an ID "B".

The logical data generation unit 15 uses the secondary workpiece information including the ID of the welded workpiece (secondary workpiece) transmitted from the robot control device (for example, the robot control device 2a) to generate the welding process logical data indicating a relationship between the ID of the secondary workpiece and the ID of each of the plurality of original workpieces used in the welding process (for example, a temporal order in which the welding process is performed on each of the plurality of original workpieces) (see FIGS. 3 and 5). Details of the welding process logical data will be described later with reference to FIGS. 3 and 5. The logical data generation unit 15 may store the ID of the welded workpiece (secondary workpiece) and the welding process logical data (see FIG. 3) in the external storage ST in association with the information on the identification sign Q.

After the welding process using the plurality of original workpieces is completed, the ID selection unit 16 sets, according to a predetermined rule, the ID of the welded workpiece (secondary workpiece) selected in advance before the welding process is performed. Here, the ID and the predetermined rule will be described. In the present specification, the predetermined rule used for the selection of the ID is a rule to be selected by the ID strength (that is, the ID is strong and the ID is weak), a rule to be randomly selected from the IDs set for the plurality of original workpieces used for the production of the welded workpiece, and a rule to generate a new ID different from the IDs of the plurality of original workpieces. The ID selection unit 16 selects or generates the ID of the welded workpiece based on any one of the rules set by the user business operator, and sets the ID.

In the present specification, the ID is constituted by, for example, a combination of a plurality of types of character codes. The types are, for example, alphabets and numbers, and are not limited thereto. For example, "ABC001XYZ999" is indicated as the ID of the original workpiece. Here, in order to make the description easy to understand, the ID is shown as a 12-digit character code formed of "three digits of alphabets", "three digits of numerals", "three digits of alphabets", and "three digits of numerals", whereas the ID is not limited to the configuration examples. Among the 12-digit character codes, for example, the upper three digits of alphabets may indicate codes of a company or a customer (for example, a supplier or a shipping destination), and other "three digits of numerals", "three digits of alphabets", and "three digits of numerals" may indicate serial numbers. The numbers of digits of numbers and alphabets are not limited to the same number of digits, and for example, different numbers of digits such as "TA001" and "RA001" shown in FIG. 4 may be set. Hereinafter, the rules for selecting or generating the ID of the welded workpiece will be described.

A rule for selecting the ID of the welded workpiece (secondary workpiece) according to ID strength will be described. As for the ID, the following two strength rules are defined as rules indicating the ID strength (that is, the ID is strong and the ID is weak). Hereinafter, the two strength rules will be described.

In a first strength rule, the ID selection unit 16 sets a division between an alphabet and a number for the ID of the original workpiece, and compares the strength of each part of the division. In a second strength rule, the ID selection unit 16 determines that, in one division between the alphabet or the number, the strength is stronger as the order of the alphabets is earlier and the strength is stronger as the number is larger. For example, it is determined that "A" is stronger than "B" in the alphabet and "2" is stronger than "1" in the number.

As a modification of the second strength rule, the ID selection unit 27 may determine that, in one division between the alphabet or the number, the strength is stronger as the order of the alphabets is later and the strength is stronger as the number is smaller. For example, it may be determined that "B" is stronger than "A" in the alphabet and "1" is stronger than "2" in the number.

Here, "ABC001XYZ999" and "ABD002XYW998" are shown as the IDs of the original workpieces to be compared. For example, the ID selection unit 16 provides divisions "ABC", "001", "XYZ", and "999" for the ID "ABC001XYZ999", and similarly provides divisions "ABD", "002", "XYW", and "998" for the ID "ABD002XYW998".

For example, the ID selection unit 16 compares the IDs of the segment parts provided in order from upper digits of the ID at any time, and determines that "ABC" is stronger than "ABD", "001" is weaker than "002", "XYZ" is weaker than "XYW", and "999" is stronger than "998". Furthermore, the ID selection unit 16 gives priority to the one with the stronger ID in the division of the upper digits and determines that the ID as a whole is strong. This is because, for example, the "alphabet" used in the upper digit of the ID does not often define the type of the original workpiece. Therefore, the ID selection unit 16 determines that the ID "ABC001XYZ999" is stronger than the ID "ABD002XYW998". The above described strength rule is merely an example, and is not limited to the above described example, and it is needless to say that a rule for determining the ID strength may be provided.

Next, the rule for randomly selecting any of the IDs of the plurality of original workpieces and determining the selected ID as the ID of the welded workpiece (secondary workpiece) will be described. In other words, when the IDs of the plurality of original workpieces are "A" and "B" (see FIG. 3), the ID selection unit 16 randomly selects "A" or "B" as the ID of the welded workpiece (for example, the secondary workpiece). "Random" means that probability that the ID "A" is selected and probability that the ID "B" is selected at the time of selection may be equal (for example, 50% each) or may not be equal. A fact that the probabilities are not equal indicates that, for example, one of the IDs may be selected more unevenly or preferentially than other IDs.

Next, the rule for selecting or generating the new ID different from any ID among the IDs of the plurality of original workpieces and determining the ID as the ID of the welded workpiece (secondary workpiece) will be described. In other words, when the IDs of the plurality of original workpieces are "A" and "B", the ID selection unit 16 generates a new ID such as "X" as the ID of the welded workpiece (for example, the secondary workpiece). Here, the original workpiece and the welded workpiece include a final weldment (for example, an n-th workpiece) produced by completing all the welding processes (for example, n welding processes (n is an integer of 3 or more)). The ID selection unit 16 may generate different new IDs for a plurality of welded workpieces to which the same welding process is completed. For example, the ID selection unit 16 may generate the ID of each of the three welded workpieces (secondary workpieces) produced by the execution of the secondary welding process, as "X", "Y", and "Z".

The robot control device 2*a* controls the processing of the corresponding main welding robot MC1*a* (specifically, the manipulator 200, the wire feeding device 300, and the power supply device 4) based on the welding process execution command sent from the host device 1. The robot control device 2*a* includes at least a communication unit 20, a processor 21, and a memory 22.

The communication unit 20 is connected to enable data communication between the host device 1 and the main welding robot MC1*a*. Although illustration is simplified in FIG. 2, data is transmitted and received between the robot control unit 25 and the manipulator 200, between the robot control unit 25 and the wire feeding device 300, and between a power supply control unit 26 and the power supply device 4 via the communication unit 20. The communication unit 20 receives the welding process execution command transmitted from the host device 1. The communication unit 20 transmits the secondary workpiece information including the ID of the welded workpiece (the secondary workpiece) produced by the welding process to the host device 1.

Here, the secondary workpiece information includes, in addition to the ID of the welded workpiece (the secondary workpiece), at least workpiece information (for example, the ID and name of the original workpiece, the welding portion of the original workpiece) including the IDs of the plurality of original workpieces used in the welding process, and welding conditions at the time of execution of the welding process. The welding conditions include, for example, a material and a thickness of the original workpiece, a material and a wire diameter of the welding wire 301, a type of the shielding gas, a flow rate of the shielding gas, a set average value of a welding current, a set average value of a welding voltage, a feeding speed and a feeding amount of the welding wire 301, the number of times of welding, and a welding time. In addition to these, for example, information indicating a type of welding process (for example, TIG welding, MAG welding, or pulse welding), and a moving speed and a moving time of the manipulator 200 may be included.

The processor 21 is configured with, for example, a CPU or an FPGA, and executes various processing and controls in cooperation with the memory 22. Specifically, the processor 21 functionally implements a program generation unit 23, a calculation unit 24, the robot control unit 25, and the power supply control unit 26 by referring to a program held in the memory 22 and executing the program.

The memory 22 includes, for example, a RAM as a workpiece memory used when the processing of the processor 21 is executed, and a ROM that stores a program defining the processing of the processor 21. The RAM temporarily stores data generated or acquired by the processor 21. The program that defines processing of the processor 21 is written in the ROM. The memory 22 stores data of the welding process execution command transmitted from the host device 1, data of the secondary workpiece information including the ID of the welded workpiece (the secondary workpiece) generated by the welding process, and data of welding process logical data (see FIGS. 3 and 4) of the secondary workpiece generated by the processor 21. The memory 22 stores a welding process program executed by the main welding robots MC1a, MC1b, and so on. The welding process program is a program that defines a specific procedure (process) of the welding process of joining the plurality of original workpieces using the welding conditions in the welding process. The program may be created in the robot control device 2a, or may be created by the host device 1, transmitted in advance, and stored in the robot control device 2a.

The program generation unit 23 generates a welding process program to be executed by the main welding robot (for example, the main welding robot MC1a) using the workpiece information (for example, the ID, the name, and the welding portion of the original workpiece) of each of the plurality of original workpieces included in the execution command based on the welding process execution command transmitted from the host device 1 via the communication unit 20. The program may include various parameters such as the welding current, the welding voltage, an offset amount, a welding speed, and a posture of the welding torch 400 for controlling the power supply device 4, the manipulator 200, the wire feeding device 300, the welding torch 400, and the like during the execution of the welding process. The generated program may be stored in the processor 21 or may be stored in the RAM in the memory 22.

The calculation unit 24 performs various calculations. For example, the calculation unit 24 performs calculation or the like for controlling the main welding robot MC1a (specifically, each of the manipulator 200, the wire feeding device 300, and the power supply device 4) controlled by the robot control unit 25 based on a welding process program generated by the program generation unit 23.

The robot control unit 25 drives the main welding robot MC1a (specifically, each of the manipulator 200, the wire feeding device 300, and the power supply device 4) based on the welding process program generated by the program generation unit 23.

The power supply control unit 26 drives the power supply device 4 based on the welding process program generated by the program generation unit 23 and a calculation result of the calculation unit 24.

The reading device 3 reads the identification sign Q assigned to the original workpiece used for the execution of the welding process or the welded workpiece produced by the execution of the welding process, and outputs the ID of the read workpiece. The reading device 3 is used by the user business operator. The reading device 3 includes at least a communication unit 30, a processor 31, a memory 32, a reading unit 33, and an operation unit 35. A monitor 34 may or may not be included in the reading device 3. When the monitor 34 is implemented as a configuration that is not included in the reading device 3, the monitor 34 is connected to the reading device 3 so as to be capable of wireless or wired communication. The reading device 3 may include a speaker (not shown) when the reading device 3 outputs information on the ID of the workpiece by voice.

The communication unit 30 is connected to the host device 1 so as to be able to communicate data with the host device 1. The communication unit 30 transmits, to the host device 1, a command for requesting information on the ID of the workpiece to which the read identification sign Q is assigned, based on a reading result of the identification sign Q by the processor 31. The communication unit 30 receives the ID of the welded workpiece transmitted from the host device 1, and outputs the ID to the processor 31.

The processor 31 is configured with, for example, a CPU or an FPGA, and executes various processing and controls in cooperation with the memory 32. Specifically, the processor 31 implements functions of the processor 31 by referring to a program held in the memory 32 and executing the program.

The memory 32 includes, for example, a RAM as a workpiece memory used when the processing of the processor 31 is executed, and a ROM that stores a program defining the processing of the processor 31. The RAM temporarily stores data generated or acquired by the processor 31. The program that defines processing of the processor 31 is written in the ROM. Further, the memory 32 stores the information on the identification sign Q read from the reading unit 33, the ID of the workpiece associated with the information on the identification sign Q transmitted from the host device 1, and the like.

The reading unit 33 includes, for example, a camera for reading a two-dimensional barcode or a laser for reading a barcode. The reading unit 33 reads the identification sign Q assigned to the workpiece, and outputs information (data) read from the identification sign Q to the processor 31.

The reading unit 33 implemented by using the camera is capable of reading, for example, the two-dimensional barcode, and includes at least a lens (not shown) and an image sensor (not shown). The image sensor is, for example, a solid-state imaging element of a charged-coupled device (CCD) or a complementary metal oxide semiconductor (CMOS), and converts an optical image formed on an imaging surface into an electric signal. The reading unit 33 implemented by the camera captures an image of the identification sign Q and performs image analysis on the captured identification sign Q. The reading unit 33 outputs information (data) on the identification sign Q acquired as a result of the image analysis to the processor 31.

The reading unit 33 implemented by using the laser can optically read the identification sign Q (for example, the bar code, the IC tag, or the RF tag), and specifically, receives reflected light reflected by the identification sign Q by using the laser, and replaces a color included in the reflected light with a binary digital signal to acquire the information on the identification sign Q. The reading unit 33 includes a laser and a CCD reader capable of receiving the reflected light of the laser, or a laser and radio frequency identification (RFID). The reading unit 33 outputs information (data) on the barcode read by the CCD reader or information (data) on the IC tag, the RF tag, and the like read by the RFID to the processor 31. When the reading unit 33 is implemented by the RFID, the reading unit 33 can read each of a plurality of IC tags or RF tags located in a range where radio waves reach at a time.

The monitor 34 serving as an example of an output unit is configured using, for example, a liquid crystal display (LCD) or an organic electroluminescence (EL). The monitor 34 outputs the ID of the workpiece received from the host device 1. The monitor 34 may be a touch interface configured by a touch panel. In such a case, the monitor 34 has a function as an operation unit 35, receives the input operation of the user business operator, generates a control signal based on the input operation, and outputs the control signal to the processor 31.

The operation unit 35 receives the input operation by the user business operator and outputs the input operation to the processor 31. The operation unit 35 generates the control signal based on the input operation by the user business operator and outputs the control signal to the processor 31. The operation unit 35 may be implemented as a touch panel of the monitor 34 described above.

FIG. 3 is an explanatory diagram showing an example of an operation outline at the time of welding using a workpiece with an ID "A" and a workpiece with an ID "B". In the example of FIG. 3, a process in which a welded workpiece (that is, the secondary workpiece Wk3) is produced by joining a circular workpiece Wk1 (original workpiece) having the ID "A" and a square workpiece Wk2 (original workpiece) having the ID "B" in one welding process is shown. As described above, the IDs "A" and "B" are, for example, 12-digit alphabets and numerals, but are collectively represented by one alphabetic character in order to make the description of FIG. 3 easy to understand.

In FIG. 3, the ID selection unit 16 selects the ID "A" as an ID read from each of the plurality of identification signs Q1 and Q2 assigned to the welded workpiece (that is, the secondary workpiece Wk3). Here, when the ID selection unit 16 determines that the ID "A" is stronger than the ID "B" based on strength information on the set ID, the ID selection unit 16 adopts and selects the stronger ID "A" as it is (that is, without changing) as the ID of the welded workpiece (that is, the secondary workpiece Wk3). The ID selection unit 16 may randomly adopt one of the ID strength or the ID "A" and the ID "B" (see the above description), and select the ID "A" as the ID of the welded workpiece (that is, the secondary workpiece Wk3). As described above, it is needless to say that the ID selection unit 16 may generate and adopt a new ID different from the ID of each of the workpieces Wk1 and Wk2 (original workpieces).

The ID setting management unit 14 sets the ID of the secondary workpiece Wk3 selected by the ID selection unit 16 to the ID "A". The ID setting management unit 14 associates the ID "A" set for the secondary workpiece Wk3 with the identification sign Q1 assigned to the workpiece Wk1 (original workpiece) and the identification sign Q2 assigned to the workpiece Wk2 (original workpiece) as an ID to be output to the reading device 3, and stores the ID "A" in the external storage ST.

When the reading device 3 reads the identification sign Q1 assigned to the workpiece Wk1 (original workpiece) before the first welding process, the reading device 3 receives the ID "A" of the workpiece Wk1 (original workpiece) from the host device 1, and outputs (displays) the ID "A" to a display screen R11. Similarly, when the reading device 3 reads the identification sign Q2 assigned to the workpiece Wk2 (original workpiece) before the first welding process, the reading device 3 receives the ID "B" of the workpiece Wk2 (original workpiece) from the host device 1, and outputs (displays) the ID "B" to a display screen R21. Further, the reading device 3 reads a plurality of identification signs Q1 and Q2 assigned to the secondary workpiece Wk3 (welded workpiece) after the first welding process. At this time, the ID "A" of the secondary workpiece Wk3 is set as the ID output to the reading device 3 by the plurality of identification signs Q1 and Q2. Therefore, after the first welding process, the reading device 3 outputs (displays) the ID "A" on the display screen even when any of the plurality of identification signs Q1 and Q2 assigned to the secondary workpiece Wk3 is read. Specifically, the reading device 3 outputs (displays) the ID "A" to the display screen R12 when the identification sign Q1 is read, and similarly outputs (displays) the ID "A" to the display screen R22 when the identification sign Q2 is read. In the display screen shown in FIG. 3, only the information on the ID displayed for easy understanding of the description of FIG. 3 is shown in a simplified manner. In the description of FIG. 3, an output example of the reading device 3 is described for all the identification signs assigned to each workpiece. However, since the ID set in each welding process is set to be unified into one ID, the reading device 3 may read at least one identification sign among the plurality of identification sign assigned to each workpiece.

Accordingly, in the welding system 100 according to the first embodiment, even if the ID of the workpiece (that is, the secondary workpiece Wk3) is randomly selected as the ID, if the ID "A" of the workpiece Wk1 (original workpiece) and the ID "A" of the welded workpiece (that is, the secondary workpiece Wk3) are the same, it may be complicated to manage whether the ID "A" is the ID of the workpiece Wk1 (original workpiece) or the secondary workpiece Wk3. Therefore, in the welding system 100 according to the first embodiment, for example, in the welding process using the workpiece Wk1 (original workpiece) having the ID "A" and the workpiece Wk2 (original workpiece) having the ID "B", the logical data generation unit 15 in the host device 1 generates welding process logical data "A-B" logically indicating a mutual relationship between the ID "A" of the workpiece Wk1 (original workpiece), the ID "B" of the workpiece Wk2 (original workpiece), and the ID "A" of the secondary workpiece Wk3. The logical data generation unit 15 stores the generated welding process logical data "A-B" in association with the ID of each of the plurality of workpieces Wk1 and Wk2 (original workpieces) stored in the external storage ST.

The welding process logical data "A-B" shown in FIG. 3 is data having a logical structure in which the ID "A" is located at a higher level and the ID "B" is located at a lower level than the ID "A". That is, the welding process logical data indicates, as viewed from the ID "A" of the secondary workpiece Wk3, which ID the original workpiece having is used and the secondary workpiece Wk3 is produced by the welding process, and also indicates a list of IDs of the plurality of original workpieces used in the welding process and a temporal order in which the welding processes are executed when the plurality of welding processes exist. Accordingly, even after the welding process is completed, the user business operator can comprehensively grasp the data related to each of the original workpieces used for the production of the secondary workpiece Wk3 without losing the information on the workpiece Wk2 (original workpiece).

Further, the host device 1 generates a record TB1 in which the ID "A" of the secondary workpiece Wk3 and the welding process logical data "A-B" are associated with each other, and stores the record TB1 in the external storage ST in association with each of the IDs of the plurality of workpieces Wk1 and Wk2 (original workpieces). The host device 1 may display, on the reading device 3 or the monitor MN1, a display screen showing the relationship between the ID "A" of the secondary workpiece Wk3 and the welding process logical data "A-B", or a display screen showing the relationship between the ID "B" of the secondary workpiece Wk3 and the welding process logical data "A-B". Accordingly, the user business operator can intuitively grasp details of the welding process that reaches the production of the secondary workpiece Wk3. Accordingly, even after the welding process is completed, the user business operator can comprehensively grasp the data related to each of the original workpieces used for the production of the secondary workpiece Wk3 without losing the information on the workpiece Wk1 (original workpiece).

The welding process logical data "A-B" is data having a logical structure in which the ID "B" is located at a higher level and the ID "A" is located at a lower level than the ID "B". That is, the welding process logical data "A-B" indicates, as viewed from the ID "A" of the secondary workpiece Wk3, which ID the original workpiece having is used and the secondary workpiece Wk3 is produced by the welding process, and also indicates a list of IDs of the plurality of original workpieces used in the welding process and a temporal order in which the welding processes are executed when the plurality of welding processes exist.

Figure 4:
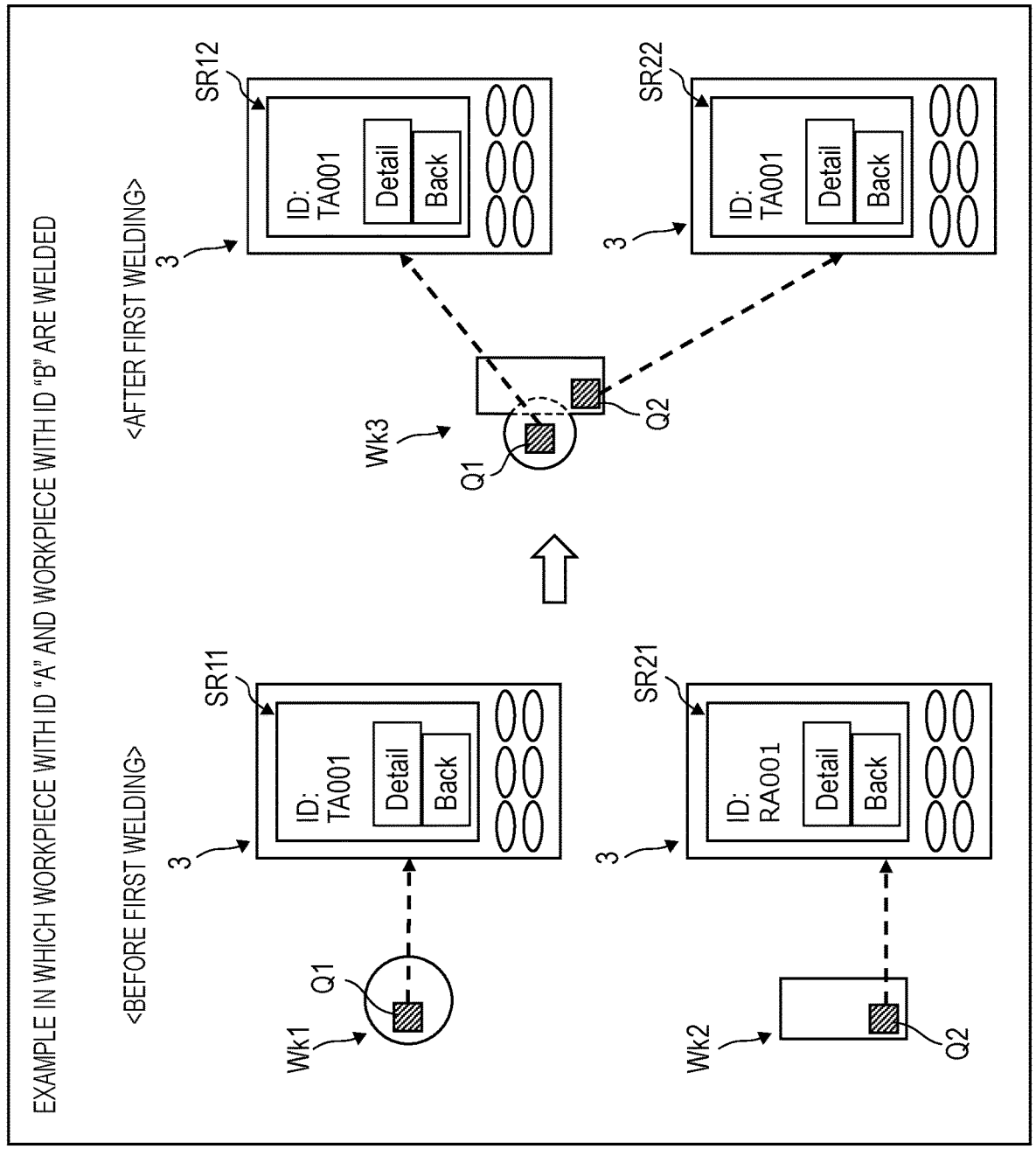
FIG. 4 is an explanatory diagram showing an example of display of a reading result of an ID during welding using the workpiece of ID "A" and the workpiece with the ID "B".

FIG. 4 is an explanatory diagram showing an example of display of a reading result of an ID during welding using the workpiece with the ID "A" and the workpiece with the ID "B". The first welding process shown in FIG. 4 is the same process as the first welding process described with reference to FIG. 3. In FIG. 4, an ID output to the reading device 3 when the ID of each workpiece before and after the first welding process is read will be described. A timing at which the reading device 3 reads the ID of the workpiece may be only before the first welding process or only after the first welding process.

In FIG. 4, the host device 1 sets a management ID "TA001" that is set and used when actually managed in a user business operator (see the following description) for the ID "A" of the workpiece Wk1 (original workpiece) shown in FIG. 3, and sets the management ID "RA001" for the ID "B" of the workpiece Wk2 (original workpiece). The host device 1 further associates the management ID "TA001" set for the workpiece Wk1 (original workpiece) with the identification sign Q1, and stores the management ID "TA001" in the external storage ST. Similarly, the host device 1 further associates the management ID "RA001" set for the workpiece Wk2 (original workpiece) with the identification sign Q2, and stores the management ID "RA001" in the external storage ST.

In FIG. 4, the reading device 3 reads the ID of the workpiece before and after the first welding process. Before the first welding process, the reading device 3 reads the identification sign Q1 assigned to the workpiece Wk1 (original workpiece) having the ID "A" and the identification sign Q2 assigned to the workpiece Wk2 (original workpiece) having the ID "B" before the first welding process.

When the reading device 3 reads the identification sign Q1 assigned to the workpiece Wk1 (original workpiece) before the first welding process, the reading device 3 receives the ID "A" of the workpiece Wk1 (original workpiece) from the host device 1, and displays the management ID "TA001" on the display screen SR11. The display screen SR11 includes a plurality of buttons "Detail" and "Back", and when the button "Detail" is selected (input) by the user business operator operation, the display screen SR11 displays various kinds of information stored in association with the information on the identification sign Q1 (data of the welding-related information related to the first welding process read from the external storage ST, customer (supplier) information on the workpiece Wk1 (the original workpiece), and the like). When the button "Back" is selected (input), the reading device 3 shifts to a screen (not shown) for reading the identification sign.

Similarly, when the reading device 3 reads the identification sign Q2 assigned to the workpiece Wk2 (original workpiece) before the first welding process, the reading device 3 receives the ID "B" of the workpiece Wk2 (original workpiece) from the host device 1, and displays the ID "RA001" to the display screen SR21. The display screen SR21 includes a plurality of buttons "Detail" and "Back", and when the button "Detail" is selected (input) by the user business operator operation, the display screen SR21 displays various kinds of information stored in association with the information on the identification sign Q2 (data of the welding-related information related to the first welding process read from the external storage ST, customer (supplier) information on the workpiece Wk2 (the original workpiece), and the like).

The host device 1 selects and sets the ID "TA001" as the ID of the secondary workpiece Wk3. The host device 1 associates the set ID "TA001" with the identification signs Q1 and Q2 assigned to each of the workpieces Wk1 and Wk2 (original workpieces) used for the production of the secondary workpiece Wk3 as an ID to be output to the reading device 3, and stores the ID "TA001" in the external storage ST. When the reading device 3 reads the identification sign Q1 assigned to the secondary workpiece Wk3 after the first welding process, the reading device 3 receives the ID "TA001" set in the secondary workpiece Wk3 from the host device 1, and when the identification sign Q2 is read, the reading device 3 receives the ID "TA001" set in the secondary workpiece Wk3 from the host device 1. The reading device 3 displays the received ID "TA001".

The display screen SR12 when the identification sign Q1 of the secondary workpiece Wk3 is read includes the ID "TA001" of the secondary workpiece Wk3 and the plurality of buttons "Detail" and "Back", and when the button "Detail" is selected (input) by the user business operator, the display screen SR12 displays the welding process logical data of the secondary workpiece Wk3 stored in association with the information on the identification sign Q1, the various kinds of information stored in association with the information on the identification sign Q1 (data of the welding-related information related to the first welding process read from the external storage ST, the customer (supplier) information on the workpiece Wk1 (the original workpiece), and the like). Similarly, the display screen SR22 when the identification sign Q2 of the secondary workpiece Wk3 is read includes the ID "TA001" of the secondary workpiece Wk3 and the plurality of buttons "Detail" and "Back", and when the button "Detail" is selected (input) by the user business operator, the display screen SR22 displays the welding process logical data of the secondary workpiece Wk3 stored in association with the information on the identification sign Q2, the various kinds of information stored in association with the information on the identification sign Q1 (data of the welding-related information related to the first welding process read from the external storage ST, the customer (supplier) information on the workpiece Wk1 (the original workpiece), and the like). When the button "Back" is selected (input), the reading device 3 shifts to a screen (not shown) for reading the identification sign.

Accordingly, the reading device 3 according to the first embodiment can visualize the IDs of the workpieces and the welding process logical data before and after the welding process without losing the information on each of the workpieces Wk1 and Wk2 (original workpieces). As described above, even when any of the plurality of identification signs assigned to the n-th workpiece is read, the host device 1 according to the first embodiment uniformly sets the same ID so that the same ID is output (displayed). Therefore, it is possible to reduce the possibility that all the identification signs assigned to the n-th workpiece are unreadable due to, for example, dirt, or breakage. Further, the user business operator can comprehensively grasp the information on the plurality of workpieces Wk1 and Wk2 (original workpiece) or the secondary workpiece Wk3 (for example, the ID or the management ID for each workpiece, the welding-related information for each welding process, and the welding process logical data in the n-th workpiece) from the information displayed on the reading device 3.

FIG. 5 is an explanatory diagram showing an example of an operation outline at the time of welding using the workpiece with the ID "A", the workpiece with the ID "B", the workpiece with the ID "C", and the workpiece with the ID "D". In the example of FIG. 5, a triangular parallelepiped workpiece Wk4 (original workpiece) having the ID "C" and a pentagonal workpiece Wk5 (original workpiece) having the ID "D" are joined together in a first welding process to produce a welded workpiece (that is, a secondary workpiece Wk6), a circular workpiece Wk1 (original workpiece) having the ID "A" and a rectangular workpiece Wk2 (original workpiece) having the ID "B" are joined together in a second welding process to produce a welded workpiece (that is, a secondary workpiece Wk3), and the secondary workpiece Wk3 having the ID "A" and the secondary workpiece Wk6 having the ID "C" are joined together in a third welding process to produce a welded workpiece (that is, a tertiary workpiece Wk7). Similarly, the IDs "A", "B", "C", and "D" are formed of, for example, 12-digit alphabets and numerals, but are collectively represented by one alphabetic character in order to make the description of FIG. 5 easy to understand.

The ID selection unit 16 in FIG. 5 selects an ID to be adopted for each of the secondary workpiece Wk6, the secondary workpiece Wk3, and the tertiary workpiece Wk7 based on the ID strength rule. It is needless to say that the rule for selecting the ID is not limited thereto. In the example shown in FIG. 5, it is assumed that the ID selection unit 16 determines that the ID "A" is stronger than the ID "B". In this case, the ID selection unit 16 adopts and selects the stronger ID "A" as it is (that is, without changing) as the ID of the welded workpiece (that is, the secondary workpiece Wk3) which is a product of the first welding process. Similarly, it is assumed that the ID selection unit 16 determines that the ID "C" is stronger than the ID "D". In this case, the ID selection unit 16 adopts and selects the stronger ID "C" as it is (that is, without changing) as the ID of the welded workpiece (that is, the secondary workpiece Wk6) which is the product of the second welding process. Furthermore, it is assumed that the ID selection unit 16 determines that the ID "A" is stronger than the ID "C". In this case, the ID selection unit 16 adopts and selects the stronger ID "A" as it is (that is, without changing) as the ID of the welded workpiece (that is, the tertiary workpiece Wk7) which is the product of the third welding process.

However, if the ID "A" of the workpiece Wk1 (original workpiece), the ID "A" of the welded workpiece (that is, the secondary workpiece Wk3), and the ID "A" of the tertiary workpiece Wk7 are all the same, it may be complicated to manage which ID "A" is the workpiece Wk1 (original workpiece), the secondary workpiece Wk3, or the tertiary workpiece Wk7. Therefore, in the welding system 100 according to the first embodiment, for example, in the first welding process to the third welding process, the host device 1 generates the welding process logical data (see FIG. 5) logically indicating a mutual relationship between the strongest ID "A" and other weak IDs "B", "C", and "D", generates a record TB2 in which the ID "A" of the tertiary workpiece Wk7 and the welding process logical data are associated with each other, and stores the record TB2 in the external storage ST.

The welding process logical data indicates, as viewed from the ID "A" of the tertiary workpiece Wk7, which ID the original workpiece having which ID is used in which the welding process the tertiary workpiece Wk7 is used and produced, and also indicates a strength relationship of the IDs of the plurality of original workpieces used in each of the welding processes, and a temporal order in which each process is executed. For example, the welding process logical data indicates that the tertiary workpiece Wk7 having the ID "A" is produced through three welding processes (the first welding process to the third welding process). In the second welding process, the workpiece Wk1 (original workpiece) having the ID "A" and the workpiece Wk2 (original workpiece) having the ID "B" are welded to each other, and since the ID "A" is stronger than the ID "B", the ID "A" is selected as the ID of the secondary workpiece Wk3. In the first welding process, the workpiece Wk4 (original workpiece) having the ID "C" and the workpiece Wk5 (original workpiece) having the ID "D" are welded, and since the ID "C" is stronger than the ID "D", the ID "D" is selected as the ID of the secondary workpiece Wk6. In the third welding process, the secondary workpiece Wk3 having the ID "A" and the secondary workpiece Wk6 having the ID "C" are welded to each other, and since the ID "A" is strong, the ID "A" is selected as the ID of the tertiary workpiece Wk7. In the welding process logical data, when viewed from the ID "A" of the tertiary workpiece Wk7, a position closer to the ID "A" indicates that a time at which the workpiece Wk1 (original workpiece) or the secondary workpiece Wk3 of the ID "A" is welded is older, and a position farther from the ID "A" indicates that the time at which the workpiece Wk1 (original workpiece) or the secondary workpiece Wk3 of the ID "A" is welded is newer. Accordingly, even after all of the plurality of welding processes are completed, the user business operator can comprehensively grasp the data on each of the plurality of original workpieces used for the production of the tertiary workpiece Wk7 without losing the information on the original workpiece or the secondary workpiece of the weak ID in each welding process.

The ID of each workpiece displayed by reading each of the plurality of identification signs Q1 to Q4 assigned to each workpiece in the first welding process to the third welding process shown in FIG. 5 will be described. Before the first welding process, the reading device 3 transmits the information on the identification sign Q1 assigned to the workpiece Wk1 (original workpiece) to the host device 1, reads the ID "A" of the workpiece Wk1 (original workpiece), and displays the display screen R11 including the read ID "A". The reading device 3 transmits the information on the identification sign Q2 assigned to the workpiece Wk2 (original workpiece) to the host device 1, reads the ID "B" of the workpiece Wk2 (original workpiece), and displays the display screen R21 including the read ID "B". In the first welding process, the host device 1 selects (sets) the ID "A" as the ID of the secondary workpiece Wk3 based on the ID strength rule. Therefore, the reading device 3 reads the same ID "A" even when any information on the plurality of identification signs Q1 and Q2 assigned to the secondary workpiece Wk3 is transmitted to the host device 1. The reading device 3 displays the display screen R12 including the ID "A" when the identification sign Q1 assigned to the secondary workpiece Wk3 is read, and displays the display screen R22 including the ID "A" when the identification sign Q2 is read.

Before the second welding process, the reading device 3 transmits the information on the identification sign Q3 assigned to the workpiece Wk4 (original workpiece) to the host device 1, reads the ID "C" of the workpiece Wk4 (original workpiece), and displays the display screen R31 including the read ID "C". The reading device 3 transmits the information on the identification sign Q4 assigned to the workpiece Wk5 (original workpiece) to the host device 1, reads the ID "D" of the workpiece Wk4 (original workpiece), and displays the display screen R41 including the read ID "D". In the second welding process, the host device 1 selects (sets) the ID "C" as the ID of the secondary workpiece Wk6 based on the ID strength rule. Therefore, the reading device 3 reads the same ID "C" even when any information on the plurality of identification signs Q1 and Q2 assigned to the secondary workpiece Wk6 is transmitted to the host device 1. The reading device 3 displays the display screen R32 including the ID "C" when the identification sign Q3 assigned to the secondary workpiece Wk6 is read, and displays the display screen R42 including the ID "C" when the identification sign Q4 is read.

In the third welding process, the host device 1 selects (sets) the ID "A" as the ID of the tertiary workpiece Wk7 based on the ID strength rule. After the third welding process, the reading device 3 transmits the information on the identification sign Q1 assigned to the tertiary workpiece Wk7 to the host device 1, reads the ID "A" of the tertiary workpiece Wk7, and displays the display screen R13 including the read ID "A". Similarly, the reading device 3 displays the display screen R23 including the ID "A" read from the identification sign Q2 assigned to the tertiary workpiece Wk7, displays the display screen R33 including the ID "A" read from the identification sign Q3, and displays the display screen R43 including the ID "A" read from the identification sign Q4.

In the description of FIG. 5, an output example of the reading device 3 is described for all the identification signs assigned to each workpiece. However, since the ID set in each welding process is set to be unified into one ID, the reading device 3 may read at least one identification sign among the plurality of identification sign assigned to the welded workpiece in each of the welded workpieces (the secondary workpiece Wk6, the secondary workpiece Wk3, and the tertiary workpiece Wk7).

As described above, the reading device 3 according to the first embodiment can visualize the IDs of the workpieces and the welding process logical data before and after the welding process without losing information on the workpieces Wk1, Wk2, Wk4, and Wk5 (original workpieces) and the plurality of secondary workpieces Wk3 and Wk6 (welded workpieces). As described above, even when any of the plurality of identification signs assigned to the n-th workpiece is read, the host device 1 according to the first embodiment uniformly sets the same ID so that the same ID is output (displayed). Therefore, it is possible to reduce the possibility that all the identification signs assigned to the n-th workpiece are unreadable due to, for example, dirt, or breakage. Further, the user business operator can comprehensively grasp the information related to each welding process (for example, the ID or the management ID for each workpiece, the welding-related information for each welding process, and the welding process logical data for the n-th workpiece) from the information displayed on the reading device 3.

Figure 6:
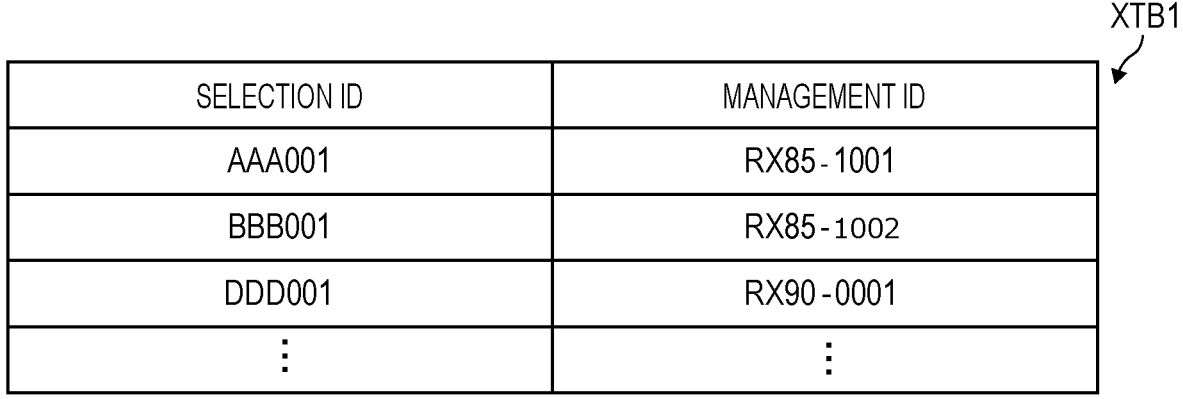
FIG. 6 is a diagram showing an example of the correspondence table between the existing IDs and the management IDs.

FIG. 6 is a diagram showing an example of a correspondence table XTB1 between a selection ID and a management ID. When a business operator (hereinafter, referred to as the "user business operator") who executes the welding process starts the welding process, an original workpiece such as a steel material used in the welding process may be supplied (in other words, may be outsourced) from the supplier in advance. For this reason, when the user business operator outsources the original workpiece such as the steel material, an ID is often assigned to the original workpiece in advance at an outsource destination. In the following description, the ID of the original workpiece assigned in advance in the outsource destination as described above is referred to as a "selection ID". When the supplied original workpiece is assigned a selection ID unique to the outsource destination, the use of the selection ID may not be suitable in terms of the management of the user business operator.

Therefore, as shown in FIG. 6, in the welding system 100 according to the first embodiment, when the selection ID is assigned to each of one or more original workpieces to be supplied from the outsource destination, the correspondence table XTB1 (an example of the management table) indicating a relationship between the selection ID and the management ID of the user business operator is created by the user business operator and stored in the external storage ST. The correspondence table XTB1 may be stored in the memory 12 of the host device 1.

For example, in the correspondence table XTB1 of FIG. 6, it is assumed that the user business operator supplies a plurality of original workpieces of the same type (for example, the same material supplied from the same supplier) from the outsource destination, and the management IDs "AAA001", "BBB001", "DDD001", and the like corresponding to the selection IDs "RX85-1001", "RX85-1002", "RR90-0001", and the like unique to the outsource destination are defined. "RX85-1001", "RX85-1002", "RR90-0001", and so on are of the same type because "RX85" before hyphen in the ID is common, and are different from each other in branch number of "RX85" (number after the hyphen in the ID), so that the original workpieces (parts) are different.

(Operation of Welding System)

Figure 7:
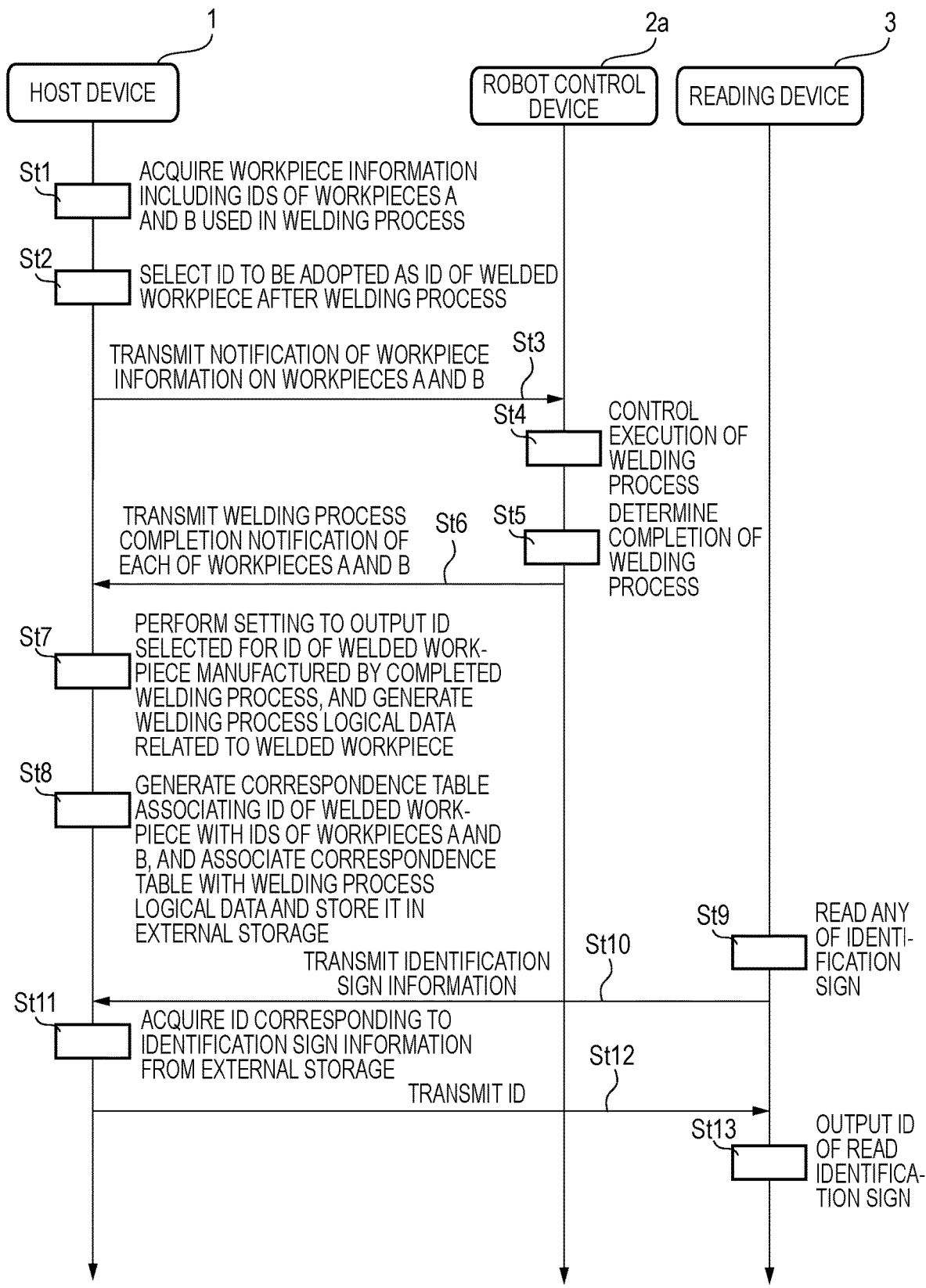
FIG. 7 is a sequence diagram showing an example of an operation procedure of ID management in the welding system according to the first embodiment.

Next, an operation procedure of the ID management by the welding system 100 according to the first embodiment will be described with reference to FIG. 7. FIG. 7 is a sequence diagram showing an operation procedure example of the ID management in the welding system 100 according to the first embodiment. In the description of FIG. 7, an operation procedure performed among the host device 1, the robot control device 2a, and the reading device 3 with respect to the welding process using the plurality of workpieces Wk1 and Wk2 (original workpieces) shown in FIG. 3 will be described as an example, and an operation procedure performed among other robot control devices 2b will be omitted. The workpiece A shown in FIG. 7 is the workpiece Wk1 (original workpiece) having the ID "A". Similarly, the workpiece B shown in FIG. 7 is the workpiece Wk2 (original workpiece) having the ID "B".

In FIG. 7, the host device 1 acquires workpiece information (for example, the ID, the name, and the welding position of the original workpiece) including an ID of the plurality of workpieces Wk1 and Wk2 (original workpieces) to be subjected to the welding process (main welding) (St1), and selects (generates) an ID adopted as an ID of the secondary workpiece Wk3 (that is, the welded workpiece) after the welding process based on the predetermined rule (St2). The ID of the secondary workpiece Wk3 (the welded workpiece) selected (generated) here may be stored in the memory 12 of the host device 1. The host device 1 transmits a welding process execution command including the workpiece information on the workpiece Wk1 (original workpiece) and the workpiece information on the workpiece Wk2 (original workpiece) to the robot control device 2a (St3). Here, in the processing of step St2, it is assumed that, for example, the ID "A" of the workpiece Wk1 (original workpiece) is selected as the ID of the secondary workpiece Wk3 (welded workpiece).

When the robot control device 2a receives the welding process execution command transmitted from the host device 1, the robot control device 2a generates a welding process program executed by the main welding robot MC1a using the workpiece information on each of the plurality of workpieces Wk1 and Wk2 (original workpieces) included in the execution command, and causes the main welding robot MC1a to execute the main welding according to the program (St4). The robot control device 2a determines the completion of the main welding (welding process) by the main welding robot MC1a by various known methods (St5), generates a main welding completion notification indicating the completion of the main welding every time the main welding of each of the plurality of workpieces Wk1 and Wk2 (original workpieces) is completed, and transmits the notification to the host device 1 (St6).

When the main welding completion notification indicating that the main welding is completed is received from the robot control device 2a, the host device 1 sets the ID "A" selected (generated) in the processing of step St2 to be output to the reading device 3 as the ID "A" of the secondary workpiece Wk3 (welded workpiece), and generates the welding process logical data (see FIGS. 3 and 5) related to the secondary workpiece Wk3 (welded workpiece) (St7). The host device 1 stores the ID "A" of the secondary workpiece Wk3 (the welded workpiece) and the welding process logical data on the secondary workpiece Wk3 (the welded workpiece) in association with each other in the external storage ST (St8).

The reading device 3 reads one of the identification signs Q1 and Q2 assigned to the secondary workpiece Wk3 (welded workpiece) produced by the completion of the main welding (St9), and transmits the information on the read identification sign to the host device 1 (St10). Here, the read identification sign is referred to as the identification sign Q2.

The host device 1 refers to the external storage ST based on the information on the identification sign Q2 received from the reading device 3, and acquires the information on the ID "A" as the ID of the secondary workpiece Wk3 (welded workpiece) associated with the information on the identification sign Q2 (St11). The host device 1 transmits the acquired ID "A" of the secondary workpiece Wk3 (welded workpiece) to the reading device 3 (St12).

The reading device 3 outputs (displays) the ID "A" of the secondary workpiece Wk3 (welded workpiece) which is received from the host device 1 and is associated with the identification sign Q2 read in the processing of step St9 (St13).

As described above, the welding system 100 according to the first embodiment acquires the information on the IDs of the plurality of original workpieces to which the identification signs are assigned, respectively, the identification signs being assigned such that the information on the IDs (identifiers) are readable; selects, from the IDs of the plurality of original workpieces according to the predetermined rule, the ID to be set for the welded workpiece to be produced by the welding process using the plurality of original workpieces; and after the selection, in a case in which any identification sign among the identification signs assigned to the plurality of original workpieces is read by the reading device, outputs, as the ID of the welded workpiece, the information on the selected ID to the reading device.

Accordingly, the welding system 100 according to the first embodiment can support more efficient management by uniformly setting the IDs of the workpieces (in other words, the welded workpieces) produced in the welding process in which the plurality of original workpieces are joined or the like and outputting the IDs to the reading device 3.

In the welding system 100 according to the first embodiment, identification signs of the plurality of original workpieces are assigned to the welded workpiece so as to be readable by the reading device 3. Accordingly, the welding system 100 according to the first embodiment can acquire information on the plurality of original workpieces used in the production of the workpiece by reading at least one of the plurality of identification signs assigned to the workpiece even when the identification sign assigned in the welding process is contaminated, damaged, or the like, by assigning the plurality of identification signs in which the unified ID is set to the welded workpiece.

In the welding system 100 according to the first embodiment, each of the IDs includes a combination of a plurality of character codes, and is selected according to an ID strength rule defined for each type of character code. Specifically, the ID strength rule is defined for adopting an ID having a strong character code based on a comparison of strength among character codes constituting the IDs of the plurality of original workpieces included in the workpiece. The character codes include, for example, an alphabet and a number. Accordingly, the welding system 100 according to the first embodiment can easily set and manage the ID of the welded workpiece (for example, the secondary workpiece).

In the welding system 100 according to the first embodiment, each of the IDs includes a combination of a plurality of character codes. The predetermined rule includes randomly employing any one of the IDs of the plurality of original workpieces included in the welded workpiece in the selection of the ID to be set for the welded workpiece. Accordingly, the welding system 100 according to the first embodiment can easily set and manage the ID of the welded workpiece (for example, the secondary workpiece).

In the welding system 100 according to the first embodiment, each of the IDs includes a combination of a plurality of character codes. The predetermined rule includes adopting another ID different from the IDs of the plurality of original workpieces included in the welded workpiece in the selection of the ID to be set for the welded workpiece to be adopted. Accordingly, the welding system 100 according to the first embodiment can easily set and manage an ID different from any of the IDs of the plurality of original workpieces used for the production of the welded workpiece (for example, the secondary workpiece).

The reading device 3 according to the first embodiment is configured to read the identification signs assigned to the plurality of original workpieces to be used in the welding process performed by the welding system 100, and includes the reading unit 33 configured to read the identification signs capable of outputting the information on the respective identifiers of the plurality of original workpieces, the processor 31 configured to acquire, based on an identification sign that has been read, the information on the identifier associated with the identification sign from the welding system, and the output unit (for example, the monitor 34) configured to output the information on the identifier that has been acquired.

Accordingly, the reading device 3 according to the first embodiment can output the ID of the welded workpiece by reading the identification sign assigned to each workpiece. Therefore, the user business operator can easily confirm the ID of the welded workpiece.

Second Embodiment

In the welding system 100 according to the first embodiment, the example in which the identification sign Q is read by the reading device 3 (that is, the example in which the ID of the workpiece is read by the reading device 3) is described. In the welding system 100 according to the second embodiment, an example will be described in which the main welding robot further includes a reading unit capable of reading information on the identification sign Q assigned to the workpiece, and the robot control device has an ID reading function.

Figure 8:
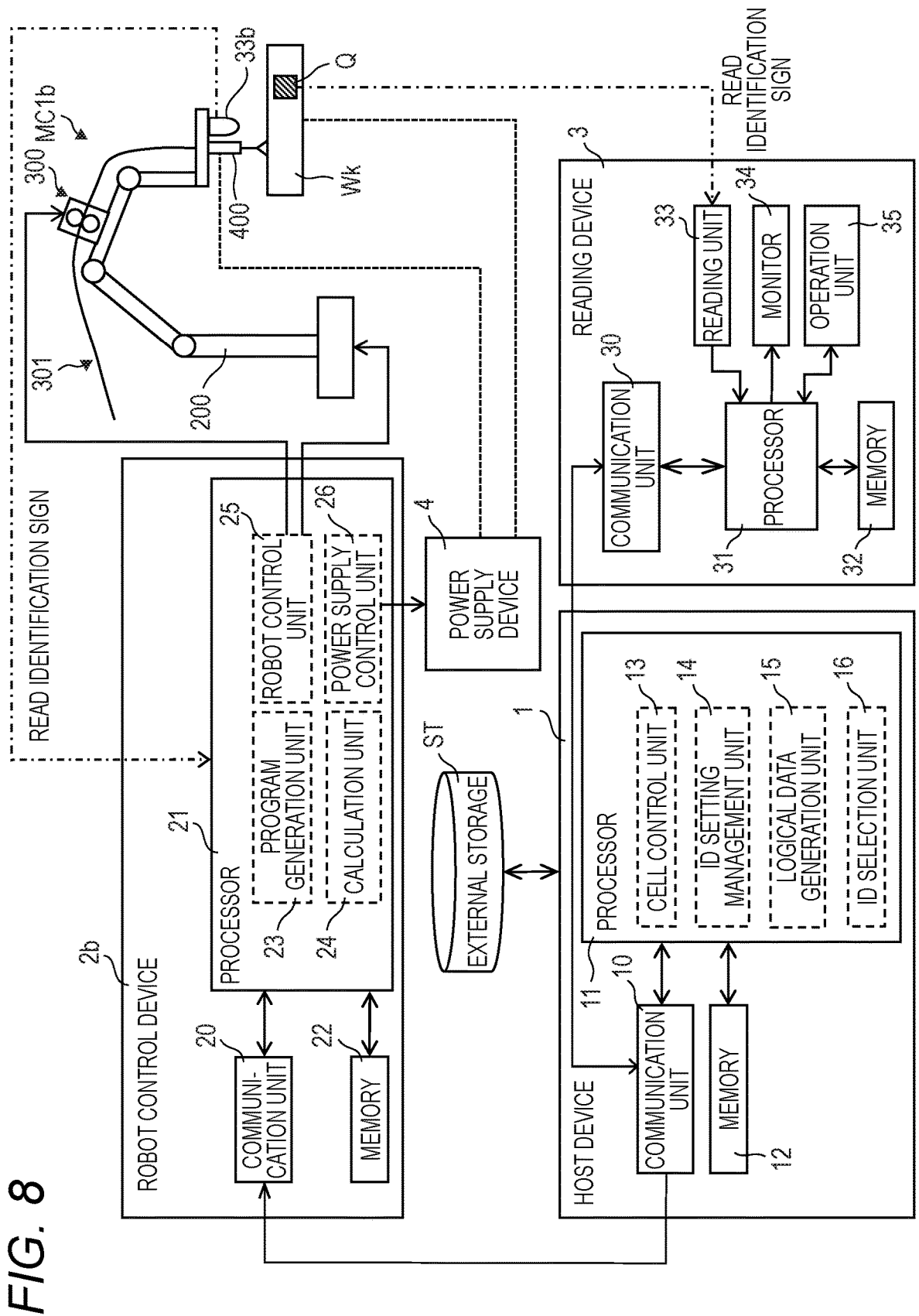
FIG. 8 is a diagram showing an internal configuration example of a host device and a robot control device according to a second embodiment.

FIG. 8 is a diagram showing an internal configuration example of the host device 1 and the robot control device 2b according to the second embodiment. The welding system 100 according to the second embodiment has substantially the same configuration as the welding system 100 according to the first embodiment. Therefore, the same components as those of the first embodiment are denoted by the same reference numerals, and a description thereof will be omitted. In the description of FIG. 8, in order to make the description easy to understand, illustration of the monitor MN1 and the input interface UI1 is omitted, the main welding robot MC1b among the main welding robots MC1a, MC1b, and so on is exemplified, and further, the robot control device 2b among the robot control devices 2a, 2b, and so on is exemplified and described.

In the welding system 100 according to the second embodiment, the robot control device and the main welding robot having the function of reading the identification sign may be a part of the robot control device and the main welding robot selected by the user business operator. That is, in the welding system 100 according to the second embodiment, all of the robot control devices 2a, 2b, and so on and the main welding robots MC1a, MC1b, and so on do not have to have the function of reading the identification sign.

The main welding robot MC1b executes the welding process and the reading of the identification sign Q instructed from the host device 1 under the control of the robot control device 2b. Before the welding process, the main welding robot MC1b executes reading of the identification sign Q assigned to each of the plurality of original workpieces using a reading unit 33b, and transmits information on the read identification sign Q to the robot control device 2b. After reading the identification sign Q, the main welding robot MC1b proceeds to the welding process, and performs, for example, arc welding in the welding process. The main welding robot MC1b may perform welding (for example, laser welding) other than the arc welding.

The manipulator 200 includes an articulated arm, and moves each arm based on a control signal from the robot control unit 25 of the robot control device 2b. Accordingly, the manipulator 200 can change the positional relationship between the reading unit 33b and the identification sign Q assigned to the workpiece Wk and the positional relationship between the workpiece Wk and the welding torch 400 by the movement of the arm.

The host device 1 generates an execution command for executing reading of the identification sign Q of each of the plurality of original workpieces based on the position information on the identification sign Q assigned to each of the plurality of original workpieces used in the welding process, and transmits the execution command to the robot control device 2b. The host device 1 generates a welding process execution command using each of the plurality of original workpieces by using the welding-related information input or set in advance by the user business operator, and transmits the execution command to the robot control device 2b.

The processor 11 in the host device 1 according to the second embodiment refers to the external storage ST based on a reading result of the identification sign Q read by the reading unit 33b, and acquires the information on the ID of the workpiece to which the read identification sign Q is assigned. The processor 11 outputs the acquired workpiece ID to the monitor MN1. The processor 11 may transmit the acquired workpiece ID to the reading device 3 and cause the reading device 3 to display the acquired workpiece ID.

The reading unit 33b includes, for example, a camera for reading a two-dimensional barcode or a laser for reading a barcode. The reading unit 33b reads the identification sign Q assigned to the workpiece, and outputs information (data) read from the identification sign Q to the processor 21.

As described above, the welding system 100 according to the second embodiment can not only read the identification sign Q using the reading device 3 but also read the identification sign Q using the main welding robot MC1b. Accordingly, the welding system 100 according to the second embodiment can read the IDs of a plurality of original workpieces or welded workpieces from the identification sign Q assigned to the workpiece Wk, for example, before, after, or both before and after the welding process, can display the read IDs of the workpieces on the reading device 3 owned by the user business operator, and can more efficiently read the IDs of the workpieces.

Since the ID of the workpiece can be read by the robot control device 2b and the reading device 3, the user business operator can select which of the robot control device 2b and the reading device 3 reads the ID of the workpiece in accordance with a production process of the welded workpiece, such as a case where there are a plurality of welding processes or a case where the welding process is executed in a different cell.

Although the various embodiments are described above with reference to the drawings, it is needless to say that the present disclosure is not limited to such examples. It will be apparent to those skilled in the art that various alterations, modifications, substitutions, additions, deletions, and equivalents can be conceived within the scope of the claims, and it should be understood that such changes also belong to the technical scope of the present disclosure. Further, components in the various embodiments described above may be combined optionally in the range without deviating from the spirit of the invention.

The present application is based on Japanese Patent Application (Japanese Patent Application No. 2019-188157) filed on Oct. 11, 2019, and contents thereof are incorporated herein by reference.

The present disclosure is useful as an identifier management method and a reading device which support more efficient management of an identifier of a workpiece produced in a process such as welding.

The invention claimed is:

1. An identifier output method to be executed by a welding system, the identifier output method comprising:

receiving a welding process command to weld a plurality of original workpieces to produce a welded workpiece;
acquiring information on identifiers of the plurality of original workpieces to which identification signs are assigned, respectively, the identification signs being assigned such that information on the identifiers are readable;
selecting, from the identifiers of the plurality of original workpieces according to a predetermined rule, an identifier to be set for the welded workpiece;
after the selecting, in a case in which any identification sign among the identification signs assigned to the plurality of original workpieces is read by a reading device, outputting, as an identifier of the welded workpiece, the information on the selected identifier to the reading device; and
in response to the welding process command, causing a welding robot to weld the plurality of original workpieces to produce the welded workpiece with the selected identifier associated with the welded workpiece,
wherein each of the identifiers comprises a combination of a plurality of character codes, and
wherein the selecting according to the predetermined rule comprises selecting, as the selected identifier, the identifier having a strongest character code based on a comparison of character codes constituting the identifiers of the plurality of original workpieces included in the welded workpiece according to a strength rule defined for each type of the character codes.

2. The identifier output method according to claim 1, wherein the identification signs of the plurality of original workpieces are assigned to the welded workpiece so as to be readable by the reading device.

3. An identifier output method to be executed by a welding system, the identifier output method comprising:
receiving a welding process command to weld a plurality of original workpieces to produce a welded workpiece;
acquiring information on identifiers of the plurality of original workpieces to which identification signs are assigned, respectively, the identification signs being assigned such that information on the identifiers are readable;
selecting, from the identifiers of the plurality of original workpieces according to a predetermined rule, an identifier to be set for the welded workpiece;
after the selecting, in a case in which any identification sign among the identification signs assigned to the plurality of original workpieces is read by a reading device, outputting, as an identifier of the welded workpiece, the information on the selected identifier to the reading device; and
in response to the welding process command, causing a welding robot to weld the plurality of original workpieces to produce the welded workpiece with the selected identifier associated with the welded workpiece,
wherein each of the identifiers comprises a combination of a plurality of character codes, and
wherein the selecting according to the predetermined rule comprises randomly selecting one of the identifiers of the plurality of original workpieces included in the welded workpiece as the selected identifier to be set for the welded workpiece.

4. An identifier output method to be executed by a welding system, the identifier output method comprising:
receiving a welding process command to weld a plurality of original workpieces to produce a welded workpiece;
acquiring information on identifiers of the plurality of original workpieces to which identification signs are assigned, respectively, the identification signs being assigned such that information on the identifiers are readable;
selecting another identifier different from the identifiers of the plurality of original workpieces included in the welded workpiece as an identifier to be set for the welded workpiece;
after the selecting, in a case in which any identification sign among the identification signs assigned to the plurality of original workpieces is read by a reading device, outputting, as an identifier of the welded workpiece, the information on the selected identifier to the reading device; and
in response to the welding process command, causing a welding robot to weld the plurality of original workpieces to produce the welded workpiece with the selected identifier associated with the welded workpiece,
wherein each of the identifiers comprises a combination of a plurality of character codes.

5. A reading device configured to read identification signs assigned to a plurality of original workpieces to be used in a welding process performed by a welding system, the reading device comprising:
a reading unit configured to read the identification signs capable of outputting information on respective identifiers of the plurality of original workpieces;
a processor configured to
select, from the identifiers of the plurality of original workpieces according to a predetermined rule, an identifier to be set for a welded workpiece to be produced by the welding process using the plurality of original workpieces,
acquire, based on any identification sign that has been read from the welded workpiece by the reading unit, information on the selected identifier associated with the read identification sign from the welding system, and
cause a welding robot to weld the plurality of original workpieces to produce the welded workpiece with the selected identifier associated with the read identification sign from the welding system; and
an output unit configured to output the information on the selected identifier that has been acquired,
wherein each of the identifiers comprises a combination of a plurality of character codes, and
wherein the processor is configured to select, as the selected identifier according to the predetermined rule, the identifier having a strongest character code based on a comparison of character codes constituting the identifiers of the plurality of original workpieces included in the welded workpiece according to a strength rule defined for each type of the character codes.

* * * * *